Nov. 8, 1932.  G. R. BROPHY  1,886,776
ARC WELDING
Filed Sept. 4, 1930

Inventor:
Gerald R. Brophy,
by Charles E. Muller
His Attorney.

Patented Nov. 8, 1932

1,886,776

UNITED STATES PATENT OFFICE

GERALD R. BROPHY, OF SCHENECTADY, NEW YORK, ASSIGNOR TO GENERAL ELECTRIC COMPANY, A CORPORATION OF NEW YORK

ARC WELDING

Application filed September 4, 1930. Serial No. 479,717.

My invention relates to arc welding in which the welding arc is maintained between a rod or wire constituting one electrode and the work constituting the other electrode. The rod or pencil may be made of a fusible metal or alloy or of carbon or some similar material. In the first case, the welding is known as metallic arc welding and, in the second case, as carbon arc welding.

Unless the molten metal of the weld is suitably protected during the welding operation from the surrounding atmosphere, it will unite therewith forming compounds that greatly affect its ductility. It has been proposed to create about the arc and molten metal of the weld selected atmospheres through the use of fluxes which decompose in the heat of the arc liberating the desired gaseous enveloping medium. It has also been proposed to muffle the parts at the seam to exclude air. Fluxes producing slag coatings on the weld metal have also been employed for shielding the molten metal.

My invention combines these several methods and means of protecting the weld metal so that a weld of uniform and pleasing external appearance which is both tough and ductile in texture may be produced while at the same time greatly increasing the efficiency of the arc during the welding operation.

An object of my invention is to provide an improved method of welding in which the work parts at the seam to be welded are shielded from the surrounding atmosphere by an enclosing chamber part of which is consumed during the welding operation in the formation of a protective medium within this chamber and immediately over the fused metal.

A further object of my invention is to provide an improved welding assembly for readily accomplishing the above-specified method of welding.

A further object of my invention is to provide an elongated shielding member adapted to engage the work parts on each side of the seam to be welded and to form therewith an enclosed chamber within which the welding operation may be performed.

Further objects of my invention will become apparent from the following description taken in connection with the accompanying drawing, and the scope of my invention will be pointed out in the appended claims.

Figure 1:
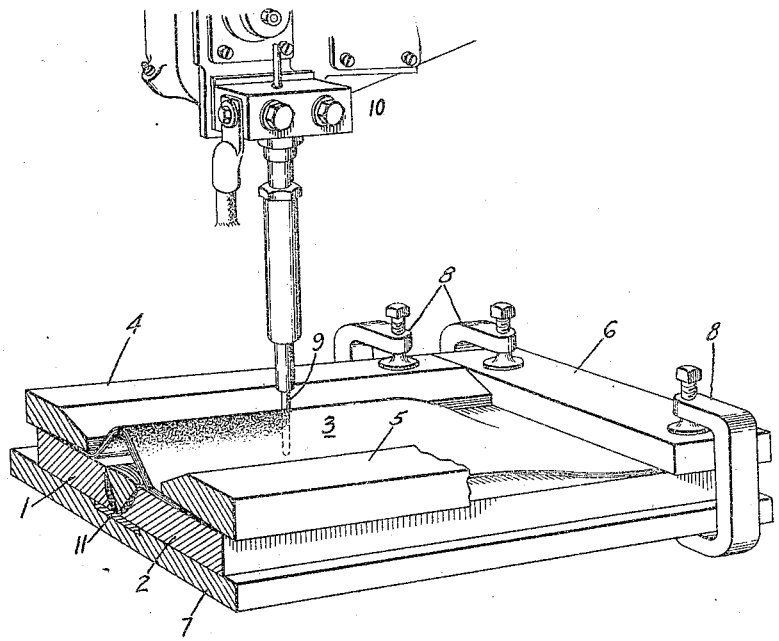
Figure 2:
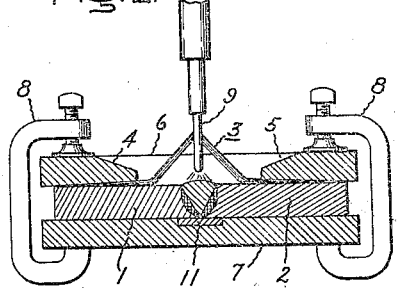

In the drawing Fig. 1 shows one assembly including one form of shielding member which I have found suitable for carrying into effect my improved method of welding, and Fig. 2 is a sectional view of the assembly shown in Fig. 1.

The welding assembly shown in Figs. 1 and 2 comprises work parts 1 and 2, a shielding member 3, and clamping bars 4, 5 and 6 for holding the shield 3 in position and for clamping the work parts 1 and 2 to a supporting member 7. The supporting member 7 may form the top of a welding table, the bed of a machine, or some other suitable work supporting means. The several parts are clamped to the supporting member through the agency of clamps 8. The welding electrode 9 in the particular illustration shown is fed to the work through the shield 3 by an automatic arc welding head 10, of which only the lower portion is shown in the drawing. Manual or semiautomatic feeding of the electrode may be used. The supporting member 7 is provided with a backing or chill member 11 located immediately below the same between the juxtaposed work parts 1 and 2.

The purpose of the shielding member 3 is to form an enclosure in which the welding operation is performed. The shield is preferably made of a combustible material such as paper. In the presence of the heat of the arc or due to contact with the electrode which becomes quite hot during the welding operation, a portion of this paper is burned producing a gaseous atmosphere of carbon monoxide and carbon dioxide within the enclosure defined by the shield. The atmosphere will be formed predominantly of carbon monoxide because of the small amount of oxygen present to support combustion within the chamber defined by the shield. The shield should be made of paper which does not burn readily, and I have found paper loaded with kaolin or clay to be suitable for this purpose. Any paper may be rendered suitable for the purpose by saturating it in a solution of sodium or potassium silicate. During the welding operation some of the clay or silicate included in the paper will be deposited upon the molten weld metal where it will act as an additional shield for the weld metal.

One convenient method of forming the shielding member 3 is to fold upon itself several times a sheet of paper or to use several sheets of paper, place the resulting built up sheet upon the work parts over the seam between the parts, arch its central portion immediately above the seam to form an enclosure such as illustrated in the drawing, and then clamping the edge-portions of the paper to maintain the paper with its central portion spaced from the weld to form an enclosure extending along the seam to be welded. Best results are obtained when one end of this elongated shield is closed. In the drawing this has been accomplished by means of a clamping bar 6 held in position relative to the shield and work parts by clamps 8.

Instead of using a shield made of folded paper as illustrated in the drawing other shields may be used. For example, the shield may comprise a preformed troughlike member which may be laid in an inverted position over the seam and suitably clamped in position. The shield may also be made up of a plurality of parts such as a frame, a covering of paper or like material, and means for clamping the paper to the frame. The top portion of the shielding member immediately above the seam may be readily separable as by slitting or providing it with a portion of reduced section in order to permit the welding electrode to pass through it freely. During the welding operation if the shield is made of paper or equivalent material its top portion will become charred and partially burned due to the action of the arc and the heated electrode will easily cut a slit through the same. The condition of the shield after a welding operation is illustrated in Fig. 1 of the drawing, the stippled portion of the shield representing the partly burned portion.

During the welding operation a certain amount of carbon will be precipitated on the pool of molten metal in the work at the seam forming one terminal of the welding arc. This carbon will combine with any oxygen dissolved in the metal with the liberation of heat. This added heat will tend to keep the surface of the heated metal molten for a longer period of time than would otherwise occur, and the metal is able to free itself of occluded gases quite readily. The precipitated carbon also combines with the metal, increasing its carbon content.

When welding in accordance with my invention the welding arc for a given current melts the electrode more rapidly and forms a greater pool of molten metal at the seam than if the welding operation were conducted in air. The shield thus acts to increase the effective heat of the arc. This gives greater penetration and superheats the metal which consequently remains molten longer. The molten metal thus has a greater opportunity to free itself of occluded or dissolved gases. Because of the shield the molten metal also cools less rapidly and the slow cooling also produces an improved texture of welded joint. The resulting weld is tough and ductile and quite superior to welds made in air. The welding arc is very quiet in its operation and the bead of weld metal in the seam smooth and fused in well at the edges to the parent metal. The surface of the bead, instead of presenting a plurality of irregular cooling seams as is usually the case, has a pleasing appearance due to the uniform spaced cooling seams resulting when welding in accordance with my method.

Various modifications of my invention will occur to those skilled in the art. Instead of using a shield formed of combustible material such as paper shields of asbestos or thin walled glass may be used. When such materials are used however, the reducing atmosphere of carbon monoxide obtained with combustible substances is lacking. The mechanical shielding effect, the increased effectiveness of the arc, the retarded cooling of the deposited metal, and the improved ductility of the weld metal will nevertheless be obtained. So long as the seam between the parts to be welded is enclosed in a chamber of fluxing material through which the welding operation is performed and within which the arc is enclosed, the quality of the weld will be greatly improved, and the efficiency of the arc increased. Best results are obtained, however, when using a shield of paper as described above. Thus, while I have illustrated and described a preferred embodiment of my invention, such modifications and variations are contemplated as fall within the true spirit and scope of my invention as set forth in the appended claims.

What I claim as new and desire to secure by Letters Patent of the United States is:

1. The method of arc welding which comprises enclosing the part to be welded in a chamber having a wall of fluxing material, fusing said part by means of an arc enclosed in said chamber, and simultaneously destroying by the application of heat a part of said chamber wall to form a protective medium over the fused metal.

2. The method of arc welding which comprises enclosing the part to be welded in a chamber having a wall of carbonaceous material, and fusing said part by means of an arc enclosed in said chamber while simultaneously burning a portion of said chamber wall to form a protective atmosphere about the arc and fused metal.

3. The method of electric arc welding which comprises placing a plurality of work parts in juxtaposition, forming about the seam between said parts an enclosing chamber having a wall of cellulosic material, maintaining an arc within said chamber between the end of an electrode inserted within said chamber and the work parts at the seam, and burning a slit through said wall of cellulosic material for said electrode while progressively moving said electrode along the seam between said parts to form a welded joint in the presence of the combustion products of said cellulosic material.

4. The method of electric arc welding which comprises placing a plurality of work parts in juxtaposition, covering the seam between said parts and the portions of the parts adjacent said seam with a combustible carbonaceous shield, arching that portion of the shield immediately above the seam to form a welding chamber, and fusing the work parts at the seam by means of an arc enclosed in said chamber while simultaneously burning a portion of said shield to form an actively reducing atmosphere about the welding arc and the pool of molten metal in the seam.

5. The method of electric arc welding which comprises placing a plurality of work parts in juxtaposition, covering the seam between said parts and the portions of the parts adjacent said seam with a destructible shield of non-inflammable paper, arching the central portion of the paper immediately above the seam to form an enclosure for the welding arc, inserting a welding electrode through the arched portion of said paper, establishing an arc between the end of said electrode and the work parts at the seam, and moving said electrode along the seam to form a welded joint beneath said arched paper covering.

6. A shielding member adapted to cover a seam to be welded and to enclose a welding arc established between the work parts at the seam and a welding electrode extending through said shielding member, said shielding member having edge portions arranged to engage the work parts on each side of the seam to be welded and a mid-portion, separable for the insertion of said electrode, spaced from the work parts to form a vaulted enclosure within which a welding operation may be performed.

7. A shielding member adapted to cover a seam to be welded and to enclose a welding arc established between the work parts at the seam and a welding electrode extending through said shielding member, said shielding member having edge portions arranged to engage the work parts on each side and at one end of the seam to be welded, and a mid-portion, separable for the insertion of said electrode, spaced from the work parts to form a vaulted enclosure within which a welding operation may be performed.

8. A shielding member of cellulosic material impregnated with a slag-forming material for use in arc welding having edge portions arranged to engage the work parts on each side of a seam to be welded, and a mid-portion spaced therefrom to form a vaulted enclosure for the welding arc.

9. A shield of non-inflammable paper for use in arc welding having edge portions arranged to make a continuous engagement with the edges of the work parts on each side of the seam to be welded between said parts, and a central portion spaced from the work parts a greater distance than the length of the welding arc to form with the edge-portions an enclosure within which a welding operation may be performed.

10. An arched shield of inflammable material impregnated with a slag-forming material having a configuration corresponding to the seam between a plurality of parts to be welded and edge portions on each side of its arched portion for engaging the work parts on each side of the seam to be welded to form a vaulted enclosure within which a welding operation may be performed.

In witness whereof, I have hereunto set my hand this 3rd day of September, 1930.

GERALD R. BROPHY.